United States Patent [19]

Baran

[11] 4,455,651

[45] Jun. 19, 1984

[54] SATELLITE COMMUNICATIONS SYSTEM AND APPARATUS

[75] Inventor: Paul Baran, Menlo Park, Calif.

[73] Assignee: Equatorial Communications Company, Mountain View, Calif.

[21] Appl. No.: 198,296

[22] Filed: Oct. 20, 1980

[51] Int. Cl.³ .................. H04J 13/00; H04B 15/00
[52] U.S. Cl. .................. 370/104; 370/18; 375/1; 343/352; 343/356; 455/13
[58] Field of Search .......... 370/18, 19, 104; 375/1; 455/12, 13; 343/100 ST, 352, 356, 358

[56] References Cited

U.S. PATENT DOCUMENTS

| | | | |
|---|---|---|---|
| 3,596,002 | 7/1971 | Ohnsorge et al. | 370/18 |
| 3,761,813 | 9/1973 | Perrin | 343/356 |
| 4,030,033 | 6/1977 | Bibl et al. | 375/1 |
| 4,114,155 | 9/1978 | Raab | 343/394 |
| 4,164,628 | 8/1979 | Ward et al. | 375/1 |
| 4,172,257 | 10/1979 | Mahner | 343/356 |
| 4,291,409 | 9/1981 | Weinberg et al. | 455/12 |
| 4,426,712 | 1/1984 | Gorski-Popiel | 375/86 |

OTHER PUBLICATIONS

*Journal of Spacecraft and Rockets,* "Communications Satellite System Concept Based on the AMPA Experiment", vol. 17, No. 1, Jan.-Feb., 1980, Durrani et al., pp. 15-19.

*IEEE Transactions on Aerospace and Electronic Systems,* "Air-Ground, Ground-Air Communications Using Pseudo-Noise Through a Satellite", vol. AES-4, No. 5, Sep. 1968, pp. 774-791, Blasbalg et al.

"A Comparison of Pseudo-Noise and Conventional Modulation for Multiple-Access Satellite Communications", IBM Journal, Jul. 1965, H. Blasbalg, pp. 241-255.

*Primary Examiner*—Gerald L. Brigance
*Attorney, Agent, or Firm*—Majestic, Gallagher, Parsons & Siebert

[57] ABSTRACT

A satellite communications system, which is inherently power limited, employing spread spectrum techniques in order to trade-off bandwidth for small ground station antennas. In a one-way system embodiment a central station transmits data to a satellite for relay to a large number of small antenna receiving stations, the transmissions being spread spectrum encoded with spreading code lengths selected to provide adequate data recovery at the least sensitive station to which the transmissions are directed. Spreading codes may also function to address particular stations. In a two-way system embodiment, the central station additionally functions as a terrestrial relay station. A plurality of small antenna transmitting stations, at least one of which may be at the same site as a receiving station, transmit code division multiplexed data via the satellite to the central relay station using sufficiently long and distinct spreading codes as to permit adequate data error rates and to distinguish the transmissions of the various stations. The central relay station reformats the received data for retransmission to the satellite for relay to the receiving stations.

21 Claims, 8 Drawing Figures

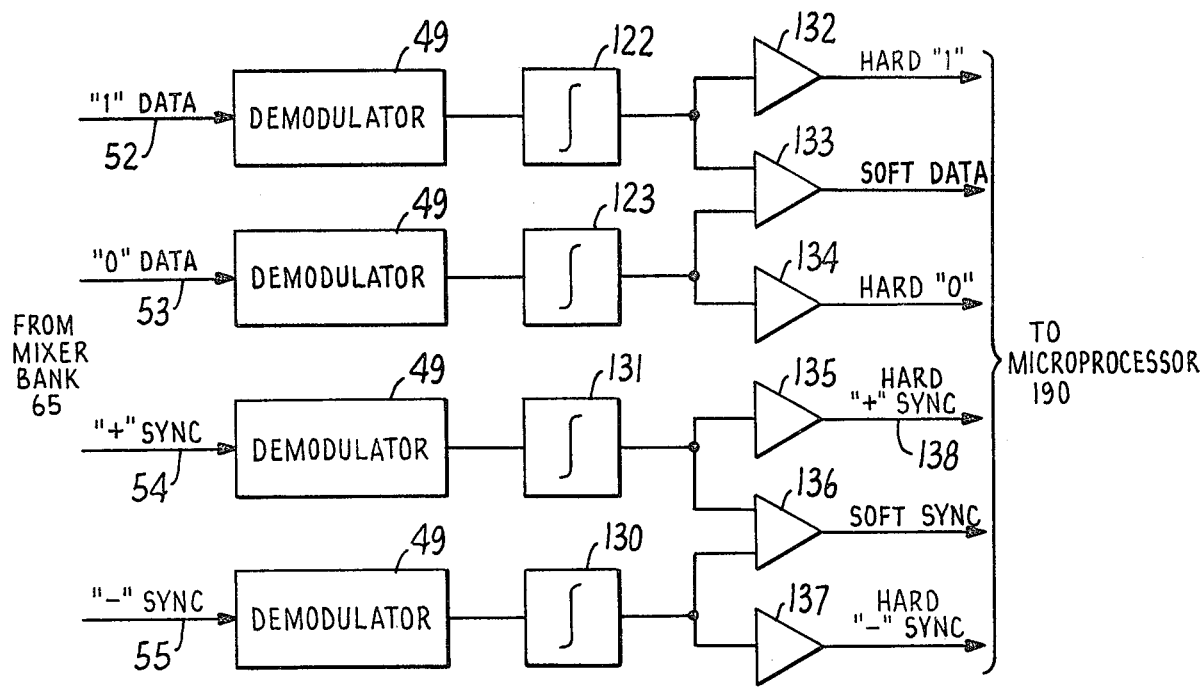
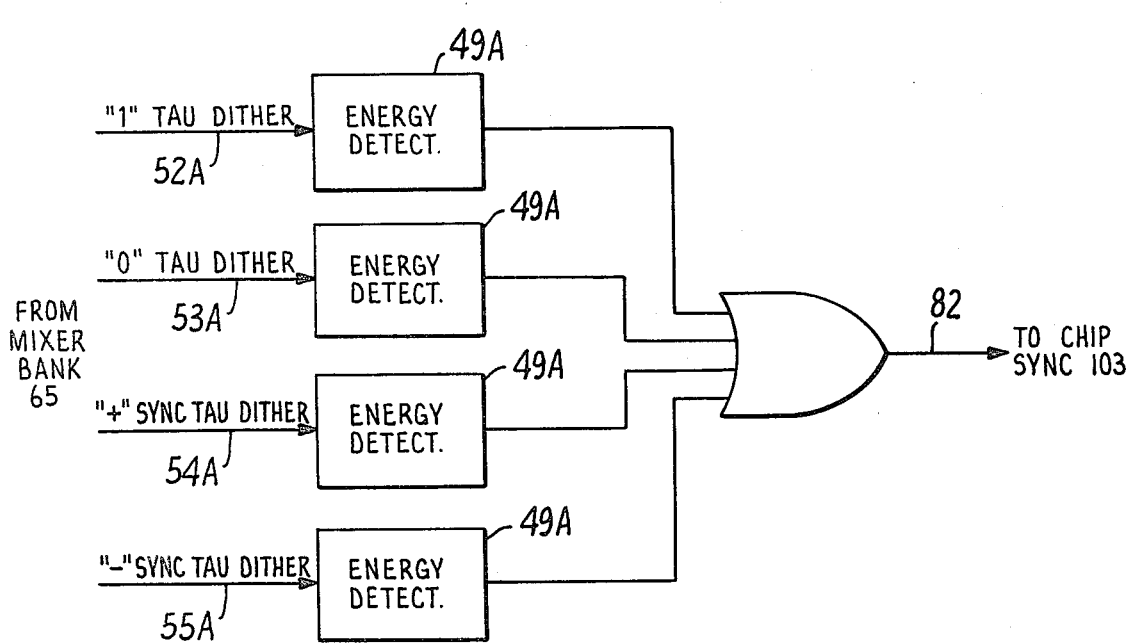
FIG. 5.

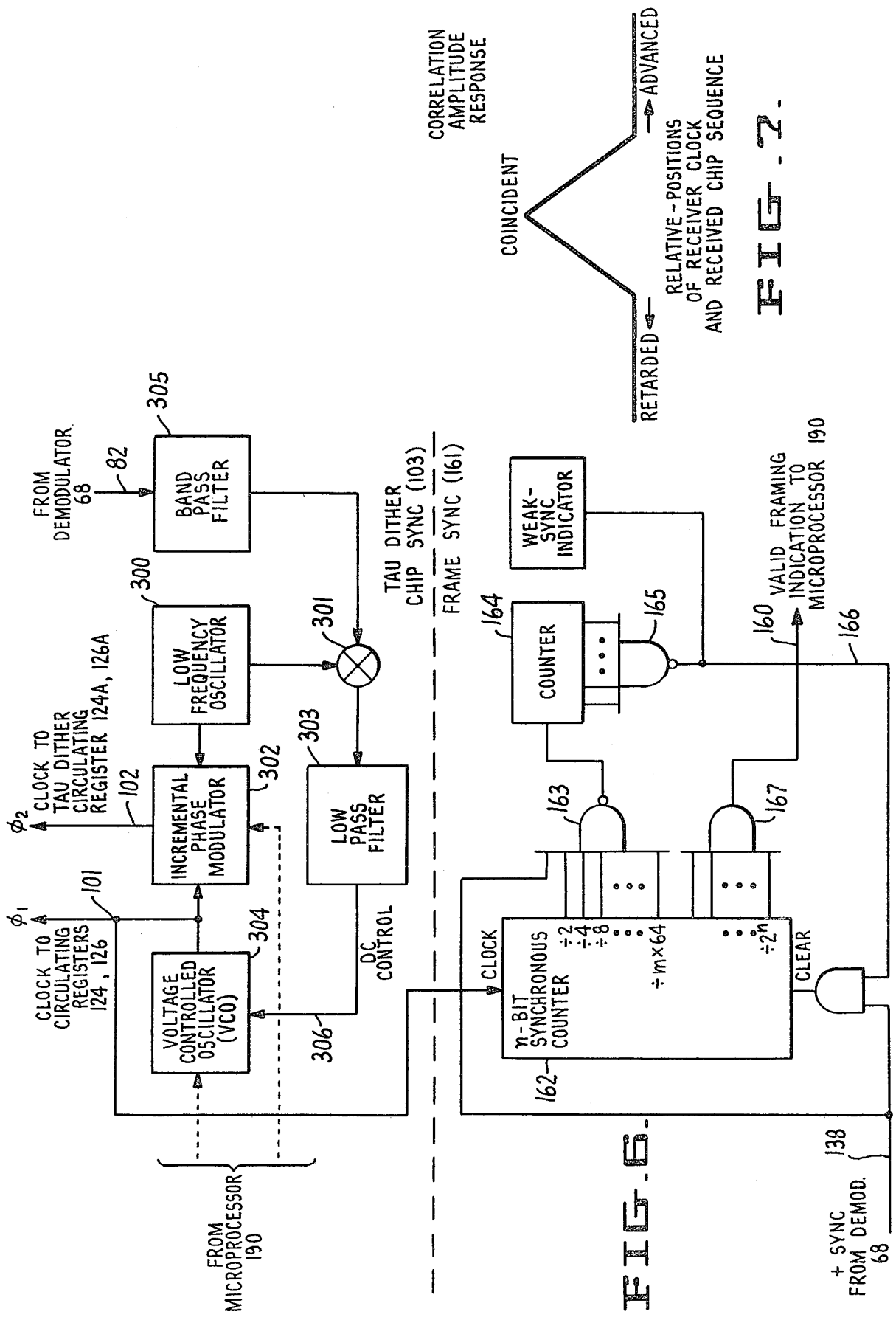

SATELLITE COMMUNICATIONS SYSTEM AND APPARATUS

BACKGROUND OF THE INVENTION

Reference is made to my related Disclosure Document No. 82,906 filed July 25, 1979 in the U.S. Patent and Trademark Office.

There is a widespread belief in the satellite communications industry that it is impossible to receive a useable signal from the typical communications satellite (broadcasting at 4 GHz with orbital spacing of 4 degrees) using small diameter (on the order of 2 feet) dish antennas and receivers having average noise figure (on the order of 2 dB).

Two primary problems and a host of minor problems give support to this view. The lack of directivity of small diameter antennas is one significant problem. Typically, geostationary satellites are spaced in orbits 4 degrees apart. The 9 degree half-power beamwidth of the typical 2 foot dish antenna at 4 GHz results in the reception of signals from adjacent satellites as well as the satellite of interest. The 9 degree beamwidth also results in a lower antenna gain at the desired frequency than that available with large diameter dishes. For example, a 2 foot dish at 4 GHz has an antenna gain of around 26 dB, while a 16 foot dish has an antenna gain of around 44 dB. At 4 GHz an antenna gain of 26 dB is too low to permit satisfactory detection of standard radio transmissions.

The second problem is the limit imposed by official regulatory bodies such as the United States' Federal Communications Commission (FCC), on satellite signal flux densities incident on the earth's surface in order to protect terrestrial communications links. When standard satellite modulation techniques (e.g. QPSK, FSK, BPSK, or PCM) are used at the permitted levels the signal level received when using a 2 foot dish antenna is far below the receiver thermal noise floor.

Other problems include the high cost of a system capable of handling a variety of data rates, intermittently used by any one of a large number of users, all requiring quick access time. Additionally, use of small modulation bandwidths, i.e. low data rates, may result in obliteration of data by such effects as carrier drift and phase and amplitude noise.

In the past, efforts to overcome these problems have focused on antenna or receiver design. The larger the antenna diameter, the larger the signal collecting area, therefore, the lower the signal levels which may be satisfactorily received. However, with increased antenna size, there is a corresponding cost increase. Likewise, development of precision antennas (i.e., antennas having precise shape, diameter and surface characteristics at the intended operating frequency) enhances antenna performance but also raises system costs. Focus in receiver design has been directed toward obtaining low noise contribution, also resulting in higher system costs.

The present invention solves the above problems by use of novel apparatus employing spread spectrum techniques as a means to enhance the effective gain and selectivity of the system without resort to the above special antenna designs or extra low noise figure receivers.

Spread Spectrum, Process Gain and Antenna Size

Spread spectrum techniques, as used in the invention, permit data signals to be extracted from the noise using small diameter antennas. In the present invention the system transmits a binary stream of data: a binary one is represented by a first sequence of binary states or elements called chips, a binary zero is represented by a second sequence of chips. The basic unit of data (in this case the data bit) is constructed from not one signal condition at a point in time but, instead, from a specific sequence of signal conditions or elements over a period of time. Hence, a single bit of information is spread or converted into a spectrum of signal conditions or elements (hereinafter referred to as the "spreading signal"). The spreading signal is at a frequency much greater than the data frequency or rate. The spreading signal has a specified length in time. Each cycle of the spreading signal waveform during that period corresponds to an element of the spreading signal. Each element may take on one of two different states. Therefore, a spreading signal comprises a corresponding number of elements, each having a specified state.

Data are, therefore, transmitted in spread spectrum format by using one spectrum of elements (or spreading signal) to represent a ones bit, and a different spectrum of elements (or spreading signal) to represent a zeros bit. For example, a ones bit may be represented by a first binary sequence of elements, and a zeros bit represented by a different second binary sequence of elements.

Another view of this process is to operate on each data bit before transmitting using a given pattern of inversions, the pattern being known to the receiver equipment. Thus, each bit can be transformed or "chipped" into smaller time increments, each increment having a frequency spectrum that is spread much wider in frequency than the original data bit.

In the preferred embodiments, the above spread signal is relayed via geostationary satellite to a remote station, where it is compared against a local reference. The local reference is the same spreading signal that was used at the transmitting station to place the data in the spread spectrum format. While the invention is described in connection with an earth satellite communications system, it will be appreciated that the principles of the invention are applicable to other power limited communications systems, including terrestrial microwave systems, for example.

The above comparison process is called "despreading." Despreading may be performed before or after demodulation. When the proper spreading signal is present in the received waveform, a data bit is recovered by the remote station receiver.

In the despreading operation, the elements of the local reference are compared against the corresponding positions in the received waveform where the spreading signal elements, if present, should be. For each match of a local reference element with a spreading signal element in the received waveform, there is obtained what will hereinafter be referred to as a "despread signal component." Random noise will also be present.

When these despread signal components and noise are summed (or integrated) over the spreading signal time period, a total "energy level" is obtained which reflects the degree to which the received waveform matches the local reference. The higher the energy level, the closer the match and vice versa. In other words, instead of an element-by-element detection process, an energy detection is performed by integrating the ensemble of element matches and mis-matches obtained over the time period of the spreading signal. A decision whether a data bit has been received is then based on the above-received energy level. Note that upon integration, the random noise present will average out. Hence, the despread signal component is enhanced while the noise component is reduced. This is known in the spread spectrum art as process gain and is defined as equaling $BW_{RF} \div R_{INFOR}$ where $BW_{RF}$ equals the bandwidth of the transmitted signal, determined by the frequency of the spreading signal, and $R_{INFOR}$ equals the frequency of the data.

In the preferred embodiments of the invention the spreading signal comprises a pair or more of selected binary sequences or codes having a specific number and sequence of elements called "chips", each chip corresponding to a "one" or "zero" state within the spreading signal. Each sequence of chips corresponds to a one or a zero within the data being transmitted. The signal conditions which implement the "chip" states may take the form of any of the various standard satellite modulation formats (e.g. Quadriphase Shift Keying (QPSK), Frequency Shift Keying (FSK), or Pulse Code Modulation (PCM)). In the preferred embodiments Binary Phase Shift Keying (BPSK) is used. As such, the phase of the carrier is unaltered or is shifted by 180 degrees depending upon the chip state being sent.

For purposes of illustration assume that the spreading signal is a sequence of one's and zero's 256 elements in length. Each element is called a chip. In the invention, the chips of the spreading code (signal) are transmitted by shifts in carrier phase: one phase state for a chip corresponding to a ones state and another phase state for a chip corresponding to a zeros state. The data to be sent are therefore spread, bit by bit, using the 256 chip spreading code sequence. The spread data are then transmitted, chip-by-chip, to the receiving station. At the receiving station the received transmission is despread and demodulated.

In a noise-free system, for each bit of information spread and transmitted, all 256 chips will be correctly received. Therefore, when on the receiving end the total energy level corresponding to a perfect match is received within the code period, it can be said, to a certainty, that a bit of information was transmitted and has been received. However, in the typical small dish antenna system the typically low signal levels present prevent all of the transmitted chips from being correctly received, which in turn precludes a perfect match. The decision of whether a bit has been transmitted is based on a total integrated energy level of all of the chips which were used to spread the bit. A decision based on noise-corrupted information has associated with it a parameter called the bit error rate. The bit error rate is defined as the probability that a bit was not correctly received. The bit error rate for a given power level may be selected as a function of the number of chips per bit. The invention uses statistical or averaging techniques to make bit, byte (group of bits), and frame (group of bytes) decisions to achieve desired bit error rates and does not require that all chips for each code be correctly received before a "bit received" decision is made. The number of chips used to spread each bit affects the bit error rate, as does conditioning a bit received indication upon the tentative reception of a minimum energy level. By varying the above decision thresholds, characteristics and other parameters, a choice of bit error rates may be achieved for each size of receiving antenna.

In the present invention a trade-off between satellite bandwidth and earth station antenna size is permitted to allow a user population of remote ground stations to operate with different data rates and antenna sizes by varying the number of chips per bit. The longer the code length, the greater the number of chips or energy level upon which the decision may be made. Likewise, by requiring that a minimum number of bits be received before treating the already-received bits in a byte as valid, the bit error rate may be further enhanced. Thus it may be seen that in the present invention the choice of the number of chips per bit, number of codes used, thresholds of bit decisions, and the degree of correlation between the codes all combine to permit a variety of data rates and antenna sizes, including very small antennas, to be included in the same flexible network and to avoid interference to or from other satellites or earth stations.

The spreading of the transmitted signal minimizes interference into other systems. The despreading of the received signal minimizes interference into the system described in the present invention. Given these interference properties the size of the earth station antenna may be made arbitrarily small by making the code length arbitrarily long.

Synchronization Requirements

The spreading of the data in the time domain dictates that the examination of the received signal at the receiving end be synchronized in time. In other words the matching or despreading of the received signal with the local reference code must coincide by chip (i.e. timing with respect to each phase change), by bit (i.e. timing of the start and end of the spreading code sequence), by byte (i.e. timing of the grouping of the transmitted bits); by frame (i.e. timing of the grouping of the transmitted bytes), and so on. Otherwise, where time synchronization is not maintained the signal components which contribute to the threshold levels looked for will be severely degraded or nonexistent. When the system is in time synchronization, the transitions of the receiver internal clock (which controls the timing of the reference code) coincide with the phase transitions of the received signal, the start of a spreading code coincides with the start of the reference code, and so on.

Interference Rejection

The process of spreading the data unit being transmitted allows a receiver to reject all those signals which are not in the proper spread format. In this manner, signals from adjacent satellites may be rejected by the small antenna receiving station. According to the literature, the level (M) of an interfering signal which the spread spectrum receiver may successfully reject is calculated as follows. Given a minimum signal to noise ratio required at the output of despreading portion of the receiver $=(S/N)_{out}$, a process gain of $G_p$, and system losses $=L_{sys}$:

$$M = G_p - (L_{sys} + (S/N)_{out}).$$

For example, a system having $G_p = 36$ dB, $L_{sys} = 2$ dB, and $(S/N)_{out} = 10$ dB, would have an interference margin $M = 24$ dB. Thus a significant level of interference may be rejected by a spread spectrum system, provided that enough chips per bit are used, thereby effectively compensating for the wide beamwidth of a small diameter antenna. In this example, Gp of 36 dB requires approximately 4000 chips per bit.

The above benefits of spread spectrum process gain are dependent upon the orthogonality or near orthogonality between the interfering signal and the desired signal. Orthogonality occurs when there is no agreement (or cross correlation) between two signals. Where cross correlation is significant, system performance will be degraded.

Another view of the effect of spread spectrum techniques upon the desired signal and interfering signal is that spread spectrum maps a narrow bandwidth signal into a wide bandwidth. When such spread signal is despread by the same spreading code the original narrow bandwidth signal is recovered. Since any interference present at this despreading is not in proper spread form, it will be mapped into a wide bandwidth. Hence, the wide bandwidth interference may be removed and the narrow bandwidth desired signal retained, by using a sufficiently narrow bandpass filter.

SUMMARY OF THE INVENTION

In accordance with the teachings of the present invention, the problems in providing low-cost satellite ground stations employing small antennas are overcome by the discovery that spread spectrum techniques can be effectively applied to satellite communications systems. The invention recognizes that such systems are power limited rather than bandwidth limited and thereby trades off bandwidth for simplicity and low-cost in the ground stations, thereby making practical a small antenna earth station.

The Spreading Codes

In the preferred embodiments of the invention, the spreading codes may take on the following characteristics. A unique set of codes may be assigned to each class of receivers. A class might include all receivers serving subscribers to a news service, or receivers serving a brokerage network.

Within each set of codes one code corresponds to a ones bit while a different code (which may be the inverse of the ones code) corresponds to a zeros bit.

A single sync code may be used for all classes of receivers if warranted. The sync signal is used to maintain all receivers in time synchronization.

The length and composition of each code is selected for minimum cross correlation among the various codes for the different classes of receivers. Code length is also a function of the sensitivity of the particular receiving station.

In each code sequence, for best results, the number of chips having a ones state is approximately equal to the number having a zeros state. Typically, chips are related to the bandwidth of the spread spectrum signal and to the data rate as follows. Chip frequency equals internal receiver clock frequency. Clock frequency equals the maximum rate at which the spreading code BPSK modulates the transmitted signal. Bandwidth of the transmitted spread spectrum signal equals approximately twice the chip frequency depending on shaping applied. If the chip rate is chosen to be fixed, the data rate is determined by the number of chips in the spreading code:

chip rate ÷ number of chips per bit = data rate.

In summary, spread spectrum techniques are used in the invention to first spread a lower frequency data signal (narrow bandwidth) into a higher frequency spread signal (wide bandwidth). This spread signal is used to BPSK modulate the carrier frequency which is then relayed to remote stations through a geostationary satellite. These remote stations have differing receiving capabilities which include small or portable dish antenna systems. Each remote station has a reference code unique to the class of stations to which it belongs. Such code is used to despread the incoming signal, resulting in the rejection of all but that data intended for the particular station. The despread data are then conveyed to the user.

System Level Summary Description of the Prefered Embodiment

The invention comprises two related communications systems: a one-way transmission network, and a two-way transmission network. The one-way system entails a transmission by a sending-station to one or more receiving stations via geostationary satellite. See FIG. 1. There is a one-way flow of information, with the sending-central station 14 transmitting a time division multiplexed (TDM) spread spectrum signal 2 to the geostationary satellite 3 which then relays the signal 12 to the receiving-remote stations (only three such stations are shown in FIG. 1 as an example, in practice the number may be much larger) 4. Unlike standard TDM, the time division format used in the invention transmits data on a "next available time slot" basis. For each class of receiving-remote stations 4 there is a unique code set assigned.

The two-way transmission network, see FIG. 2, involves a two-way flow of information. This involves a doublehop transmission, i.e., two transmissions through the satellite: one remote station 4A communicates with another remote station 4 by transmission 22, 23 via satellite 3 to a central station 14 which then retransmits 2, 12 via the same satellite 3 to the desired remote station 4. It will be noted that the same satellite is employed in different frequency bands for the inbound and outbound links. Also, it will be appreciated that a particular site will typically have a transmitter station 4A and a receiving station 4. Also, as in FIG. 1, while only two stations 4 and 4A, respectively, are shown, in practice there can be a very large number of such stations. The antenna 21 is also a small antenna such as antenna 5 described in connection with receiving stations 4. In practice, two antennas or a single antenna with a diplexer can be used, or a single antenna may be switched between transmitting and receiving modes.

Due to the FCC requirement that earth transmissions to a particular satellite may not interfere with adjacent satellite positions, a minimum antenna diameter is required for the remote station "transmitting" antennas 21. For example, for a transmitting frequency of 6 GHz, a minimum antenna diameter of four feet may be required to prevent interference with adjacent satellites.

The retransmission 2, 12, or "out-bound" link, is the one-way transmission system described previously, see FIG. 1. The first transmission links 22, 23, or "inbound" links, are code division multiplexed (CDM) spread spectrum signals, in which each signal is one of a pair of coded sequences of chips with one member of the pair representing ones bits and the other zeros bits. Each inbound transmitter station has a different pair of sequences (codes). The central station 14 in the two-way network differs from that in the one-way network in that it has the additional capability of receiving and despreading CDM spread spectrum signals transmitted by the remote stations 4A via the satellite 3. In order to do this the central station 14 maintains a bank of receivers 273, see FIG. 3, through which are circulated the CDM reference codes for all remote stations 4, 4A in the system.

The use of CDM in the inbound link permits a large number of mutually unsynchronized remote stations to access the same transmission channel. The CDM technique as employed in the inbound link is necessary because of the lack of coordination among the remote transmitting stations 4A. Use of CDM in the inbound link has the advantage of permitting a remote station 4A to transmit intermittently, continuously, or at some other rate without affecting the timing or characteristics of the transmissions from other remote stations.

The spreading codes used in the inbound link 22, 23 and the outbound link 2, 12 differ. The outbound codes are shorter in length and are unique to a class of remote stations. Stations within a class are differentiated by minimal addressing within the bit stream. The inbound codes are significantly longer and are unique to individual remote stations. Among the reasons for a longer inbound code are: (1) the need for a higher processing gain to compensate for the low signal levels which result when a small diameter antenna 21 is used to transmit from the remote station 4A to satellite 3; (2) the low power of a small transmitter designed to be low in cost and low in amount of interference with terrestrial microwave networks operating in the same frequency band; and (3) the larger number of uncorrelated codes available with a longer code length (as required by the CDM format utilized).

System Level Operation of the One-Way Transmission Network—FIG. 1

The one-way transmission network comprises a central station 14, a geostationary satellite 3, and remote stations 4. The central station 14 comprises user input links 11, an intelligent data concentrator/encoder 10A, and a transmitter 17. The geostationary satellite 3 comprises a transponder system which receives signals from the central station 14 at one frequency, for example 6 GHz, and translates, amplifies and transmits the signal at a different frequency, for example 4 GHz, to the remote stations 4. The remote stations 4 receive the satellite-relayed transmission 12 from the central station 14 using small diameter dish antennas 5. The received signal is then detected by either of two processes. The first process requires that the received signal be first despread using the local reference code, then demodulated, while the second process involves first the demodulation of the received signal, then the despreading of the demodulated waveform.

Despreading involves the multiplication of the incoming signal with the reference code. There are at least two reference codes used by each receiver: a ones bit code, and a zeros bit code. The ones bit code may be independant of the zeros bit code, or it may be the inverse (polarity) of the zeros bit code. In addition, a code may be altered to contain more than a single bit of information. For example, assume that a remote station was initially set up to detect 256 chips per bit information but due to equipment improvement has improved signal to noise ratio sufficient to handle 64 chips per bit information. There are at least two options available to increase the data rate handling capability of the station: (1) reassign codes to the station, this time 64 chips long, or (2) break the existing code up into sections, with each section corresponding to a bit of information.

As to the latter option, a code portion unchanged could correspond to a ones bit and a code portion inverted (polarity) could correspond to a zeros bit.

Generally, one set of reference codes will be assigned to a class of receivers.

Alternatively, several sets of codes may be used for each class of remote stations, with one set reserved for data being transmitted, another set reserved for administrative matters, and so on. The code length is determined by the size of the smallest antenna used by the remote stations in a class so that all can receive the data. Synchronization information may be conveyed to the remote stations in one of several ways. One method is to include a sync character within the data itself, but at a fixed interval of time. Or, if necessary, a separate sync bit in a code common to all receivers may be used. Where a sync bit code is used code length is chosen so that the remote station receiver with the smallest antenna may receive the sync signal and thus be maintained in a synchronized condition.

Demodulation involves the detection of the modulation form used by the central station 14. In the second method of detection, as described above, the demodulator converts the BPSK signal into pulse form at the chip frequency rate for later despreading. In the first method of detection, the demodulator detects the presence or absence of the baseband waveform in the previously despread signal.

Referring to FIG. 1, data are received by the central station 14 via input user links 11 such as modems. The data may be received at a variety of rates, including 75 baud and 1200 baud. The data concentrator 10, in conjunction with microprocessor 212, which can be a general purpose microprocessor, extracts from the data or the source of the data, the identity of the remote station or stations 4 to which the data are to be sent. The data concentrator 10 accumulates and arranges the data into bit and byte formats. In like manner the data concentrator 10 arranges data from the other input links 11. The data are then sent to the transmitter for transmission on a prioritized or first-in first-out basis, character-by-character or by blocking into packets with address headers.

Thus as data comes in from the various users it is accumulated. As soon as a byte of data for a particular user has been accumulated the byte of data is ready to be transmitted or formed into packets. The byte to be transmitted is routed out of the data concentrator 10 to a delay buffer 18. The delay buffer 18 is controlled by a clock 18A and is activated whenever a sync code or sync character is to be inserted in the data stream.

As the data are routed through the delay buffer 18, the microprocessor 212 retrieves from storage the address to which the particular data are to be sent as well as the key for the spreading code for the class of stations to which the addressed station belongs. The microprocessor 212 then causes the spreading code to be generated in the code generator 16, whose output is used to multiply 20 the data stream emerging from the delay buffer 18. The microprocessor 212, code generator 16, and delay buffer 18 are all controlled by a common clock 18A to ensure proper time synchronization of the data spreading and insertion of the sync code or character.

Thus the data concentrator 10 receives the parallel inputs from the input user links 11, accumulates the data into bit and byte forms, then sends the data along in serial form for spreading (multiplication 20 by a spreading code), and then transmission to the remote stations 4.

At the transmitter 17 the spread, formated data BPSK modulates an RF carrier. The modulated signal is then translated up to the carrier frequency and then transmitted to the remote stations 4 via geostationary satellite 3.

The remote stations 4 receive the spread data stream using small diameter dish antennas 3 and continuously compare the spread data stream with the sync code (if the system uses a sync code) as well as the data codes of the class to which the particular remote station belongs. Time synchronization at the remote stations 4 is achieved on a chip, bit, byte and frame level.

Chip synchronization entails the aligning of the clock waveform (which controls the receiver reference codes) with the chip frequency waveform. In other words, the frequency of the receiver clock must match the chip rate and the transitions of each waveform phase must coincide. In the preferred embodiment Tau-dither synchronization is used. In this embodiment the despreading spreading waveform is alternately made to be early by a fraction of a chip length and then late by the same amount. Small differences between the two then provide the steering information to make "early" equal to "late". When despreading is performed before demodulation, Tau-dithering is performed on the bit to an accuracy of one quarter to one-eighth of a chip, thereby achieving bit and chip synchronization at the same time. In the special case when no separate sync code is used, a unique sync character is inserted within the data stream to indicate byte sync and the start of either fixed or variable length packets.

Referring briefly to FIG. 3, when a sync code is used, frame synchronization (the proper positioning of the receiver reference codes with respect to the start of each bit code in the incoming signal, as well as to the start of the incoming sync code) is accomplished by framing sync circuitry 161, described below in greater detail. A simplified implementation of the one-way transmission network is the case where a single spreading code is used to communicate both data and sync characters. In such case, time lock is first achieved— that is, matching the internal reference code with the incoming chip stream by sliding the internal reference in time relative to the incoming chip stream until a match is detected. Once the internal reference code is approximately aligned with the corresponding code sequence in the incoming data stream a reference point is established and Tau-dither techniques are used to maintain reference with the incoming stream. Thus, bit sync and chip sync are achieved simultaneously, followed by continuing tracking.

In this simplified implementation, the sync signals are unique characters imbedded within the data stream occurring at intervals indicating the start of either fixed or variable length packets. Therefor, the incoming chip stream must first be despread before time synchronization may be performed. Therefore, before byte and frame sync may be performed, the incoming chip stream must be despread, chip and bit sync must be achieved, and the despread data must be demodulated. After demodulation, the examination of the data stream for the sync character is performed within the microprocessor or by a special interface chip programmed to seek a given bit pattern. A more detailed description of the synchronization process in the above single-code implementation will be provided below.

When the looked-for spread data are present in the received signal, the output of the despreading circuitry 139 is demodulated and integrated 68, and the energy level in the separate detectors (corresponding to ones, zeros, and sync data) is evaluated. The microprocessor 190, which can be a general purpose microprocessor, examines these outputs to determine whether a sufficient energy level is present to indicate the reception of a bit. This threshold energy level is determined by the required bit error rate.

When a certain minimum number of bits have been received (for example, five bits out of an eight-bit byte), there is good reason to believe that a byte of data was sent and the bit decision threshold can be changed to achieve an improved statistical estimation. When there are missing bits and the minimum number of bits have been received, the microprocessor 190 lowers the energy level threshold, reexamines the output energy levels, and makes a best-guess of the missing bits which will complete the byte of data.

The despread data are then converted into RS-232 or other standard format and conveyed to the remote station user via printer 191 or other Input/Output (I/O) device.

Advantages of the One-Way Transmission Network

As implemented, the one-way aspect of the invention has many advantages. First, the central station data concentrator 10, see FIG. 1, format permits the transmitting of codes of differing lengths. With a chip rate assumed fixed by the internal clock of the system, the code length assigned to a particular class of stations determines the rate at which data may be transmitted to that class. However, since the transmitted stream is time division multiplexed, codes of differing lengths may be intermixed within the data stream without interfering with the overall timing of the system. Typical transmitted data rates range from 45 baud to "facsimile bursts" in the megahertz range. As to the latter data rate, a facsimile burst would entail no spreading of the data because such rate would be used for stations with sufficiently large receiving antennas such that use of spread spectrum techniques would be unnecessary. The microprocessor 212 would sense that no spreading was required and permit the data to be passed through the multiplier 20 unaffected.

Second, microprocessor control (microprocessor 212) of the data concentrator 10 and the data spreading 20, 16 permits a large degree of flexibility in interleaving separate data streams within the overall transmission.

Third, since the microprocessor 212 maintains a record of the remote stations to which data from a particular user input is to be addressed, the sender need not know the spreading code of those remote stations. Nonetheless, addressing of a particular station within the class of stations served by a particular user may be accomplished if desired by minimal addressing within the data bit stream.

Fourth, the ability of the central station 14 to accommodate a variety of data rates permits the use of statistical multiplexing techniques to select formats and sequencing to achieve the most efficient use of the communication channel.

Fifth, as conditions change (e.g. addition of or change in character of the remote stations in a class) modifications of codes and formats may be easily implemented by reprogramming the microprocessor 212 external memory.

Sixth, since the remote stations are microprocessor controlled (microprocessor 190, which can be a general purpose microprocessor) each remote station 4 may be reprogrammed, by transmissions from the central station 14, to accept different codes of differing lengths, for example, when an increase in satellite transmitter power levels permit fewer chips per bit or when a more stringent bit error rate leads to a requirement for more chips per bit.

Seventh, the use of spread spectrum in the system allows small dish antenna stations to be successfully employed without exceeding regulatory imposed spectral power density limitations and without interference to or from terrestrial or geostationary interference sources.

Eighth, since each remote station can be separately addressed through the spreading code used, packet type formats or special preambles could be avoided. However, should preamble formats or packet addressing be required for certain stations, such formats may be implemented in bit form and sent as regular data without affecting reception of data by other nonpreambleusing stations.

Ninth, the invention, as implemented, is power rather than bandwidth limited. Should the process gain of the system be insufficient to overcome a particular interference source, the system carrier frequency could be reassigned, the chip rate may be altered, or the code sequence modified.

Finally, because the system utilizes a small portion of the transponder bandwidth of the geostationary satellite 3, a number of similar channels utilizing different carrier frequencies within the transponder bandwidth may be implemented to expand the capacity of the transponder up to the limits of the available transponder power. However, the preferred embodiment utilizes a single outbound channel, with all or a substantial fraction of the transponder power being concentrated within that channel.

System Level Operation of the Two-Way Network—FIG. 2

The two-way network utilizes the "outbound" link 2, 12 which comprises the one-way transmission network, see FIG. 1, but adds an "inbound" link 22, 23, as well as capacity in the central station to receive long code length CDM transmissions from remote stations 4A. Thus, at each remote station site, both a transmitting station 4A and a receiving station 4 are provided The central station 14 is also given the capability of monitoring and recording system usage by each remote station.

The two-way network permits simultaneous CDM transmission to other remote stations 4 via the central station 14 by any or all remote stations 4A. Each remote station 4A uses the same frequency, and does not require TDM hardware. The network uses the higher antenna gain provided by the large dish 270 of the central station 14, in conjunction with high process gain provided by use of long spreading code lengths, to compensate for the low signal levels being transmitted by the remote station small dish antennas 21.

In addition the retransmission of the information by the central station 14 to the intended remote stations 4 via the "outbound" link is at a power level much greater than that available from direct transmission by the remote station 4A.

The transmission capability 230, FIG. 3, which is added to each remote station, spreads the data provided by the remote station user using a spreading code having a length of a thousand or more chips. The spread data are then transmitted, without sync codes or characters, using a small diameter dish antenna 21, on a CDM basis. In the preferred embodiment the transmitting antenna 21 is a minimum of 4 feet in diameter to meet regulatory beamwidth limitations. Timing synchronization for spreading of the data is derived from the receiver section of the remote station 4.

At the central station 14 banks of despreading receivers 273 are maintained. To minimize equipment costs, despreading receivers are maintained for only a subset of all expected inbound transmitting stations. This subset is periodically changed to assure reception of all inbound transmissions. Each receiver 273 is assigned a code corresponding to one remote station in the system. As with the receivers in the remote stations of the one-way network, these despreading receivers 273 are constantly monitoring the signals received by the large dish antenna 270. Typically, the number of remote stations will be very large, therefore the bank of despreading receivers 273 will circulate only a portion of the possible spreading codes corresponding to the remote stations that may be transmitting at any given moment. However, the number of despreading receivers is selected statistically in light of the expected data traffic so that the delay between a remote station transmission and detection of such transmission by the central station 14 is kept small. As the various remote station codes are circulated through the despreading receiver bank 273, the occurrence of a match of despreading code with the received data stream will cause the particular receiver in the bank to retain that despreading code until the particular transmission has been concluded.

Because of differences in location of each remote station, gradual changes in satellite orbit, changes in the rotation of the earth, and other factors, there is a distinct and different time delay associated with the transmission from each remote station. In one implementation of the invention the necessary timing corrections are done at the central station 14 in setting the timing of the circulation of a particular code in a despreading receiver 273. In another implementation, each remote station maintains its own time delay correction factor and adjusts the timing of its transmission with respect to the received sync pulses and chip positions.

Included in the despread data from a remote station transmission is the address of the remote station to which the data are to be sent. Once the data are despread by the despreading receiver 273 they are treated as if they were data in the one-way network, supra, and processed by the data concentrator 10. Microprocessor 212 retrieves the spreading code for the desired remote station. The data concentrator 10 arranges the data into bit, byte, and frame formats. The data are then spread 20 according to the addressed receiver code, on a prioritized or first-in first-out basis, and then transmitted 17, see FIG. 3, via geostationary satellite 3 to the desired remote station.

BRIEF DESCRIPTION OF THE DRAWINGS

FIG. 5 is a block diagram of the demodulation and energy detection circuitry.

FIG. 6 is a block diagram of the chip, bit and frame synchronization circuitry.

FIG. 7 is an illustration of the correlation response when two identical code sequences are compared to each other at different degrees of coincidence.

DETAILED DESCRIPTION OF THE PREFERRED EMBODIMENTS

Figure 3:
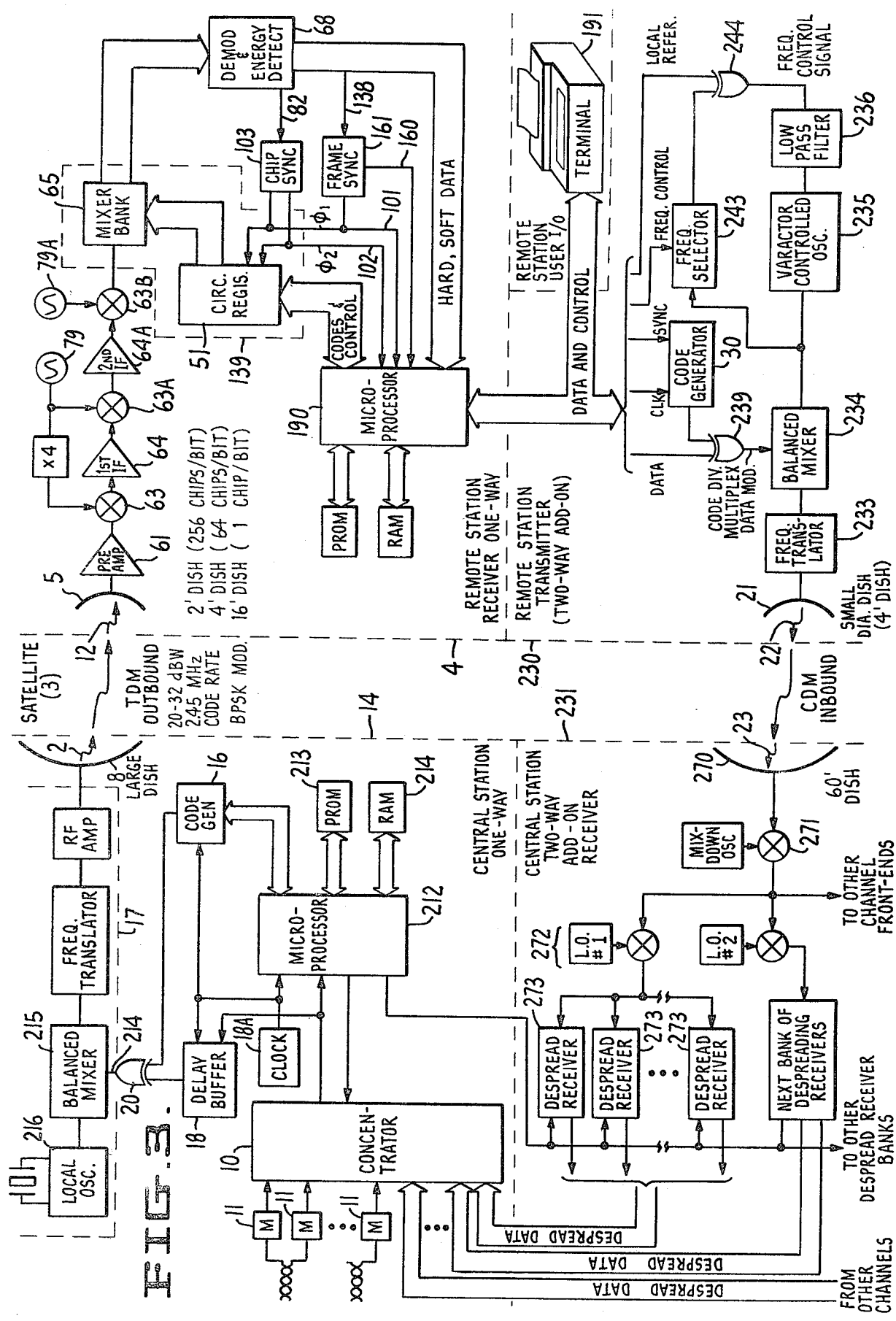
FIG. 3 is a functional block diagram of the system level interaction of the various components of the transmission networks in accordance with the present inventions.

FIG. 3 illustrates the functional interrelationship between the various elements of the one-way and two-way transmission networks. Reference to more detailed figures will be made and more detailed description furnished when certain elements of special significance are being described. Although one combination of elements from which the invention may be implemented is described, there are numerous other combinations which may implement the invention equally well.

The selection of the spreading code length was influenced by: receiving antenna (5) size, receiver noise figure, transponder (3) power, bandwidth of the transmitted signal, the required bit error rate, the number of unique codes required, the data rate, and the chip rate selected, among other factors.

For the preferred embodiment of the outbound link, remote stations having 2 foot dish antennas are assigned 256 chips per bit spreading codes, and remote stations having 4 foot dish antennas are assigned 64 chips per bit spreading codes.

Remote stations having 16 foot dish antennas do not require the use of spread spectrum techniques.

For the inbound link, all remote stations 4A transmit using 4 foot dish antennas 21, 2048 chip per bit spreading codes, and signal levels of generally under one watt of power.

The code length per bit (outbound only) is 256 chips long, in order to keep the 2 foot dish remote stations (the least sensitive receiving stations) in lock. In the special case where a single code is used to transmit both data and sync information, the sync information takes the form of a sync character imbedded within the data stream.

A sync code or character is sent at a fixed interval, for example, once every 512 bits, where each bit sent is assumed to be in the longest code being used or, once every tenth of a second. A frame is selected to equal the sync code interval. The chip rate is selected to be 2.4576 MHz. The chip rate, frame interval and sync interval therefore all occur at fixed times. The data rate, however, is a function of the spreading code length selected. Therefore for 2 foot antenna remote stations data rate will be 2.4576 MHz÷256 chips per bit, or 9600 in bits per second. On the other hand when a 4 foot remote station is addressed data rate will be 2.4576 MHz÷64 chips per bit, or 38,400 bits per second. As is generally true of all codes utilized in this system, the codes selected are orthogonal or near orthogonal to one another, and each has a near equal number of ones and zeros.

It will be understood that the fixed chips rate of 2.4576 MHz is not critical. The spreading code lengths are chosen to provide low error rates for the signal levels obtained with present state of the art receiver noise figures. If higher error rates can be tolerated or if different receiver noise figures are present, the spreading code lengths should be changed accordingly.

Geostationary Satellite Transponder

In the preferred embodiment the geostationary satellite 3 is used to relay transmissions between the central station 14 and remote stations 4 and vice versa. The heart of the satellite is a transponder which receives signals 2 at a nominal 6 GHz frequency and which retransmits 12 such signals at a nominal 4 GHz frequency. The maximum radiated power permitted to be transmitted by the transponder is set by FCC regulation and is -149 dBW per square meter per 4 KHz band. The effective isotropic radiated power (EIRP) transmitted by the geostationary satellite 3 in the preferred embodiment of the invention is 20 to 32 dBW. For a chip rate of 2.4576 MHz the bandwidth of the signal relayed by the geostationary satellite 3 is approximately 4.9 MHz. The power of the transmitter may be increased to 32 dBW in the same 4.9 MHz bandwidth without exceeding the flux density limits. Since the typical bandwidth of a satellite transponder is 36 MHz, it is clear that the relayed signal is power rather than bandwidth limited.

Remote Station Receiver

Referring now to FIGS. 3, 4, 5 and 6, the receiving circuitry of the remote stations 4 will be described. The receiver front end (pre amp) 61 is of standard design for the reception of signals in the 3.7 GHz to 4.2 GHz range.

The signal out of the front end pre-amplifier 61 assumed to be 4000 MHz is mixed-down to the first IF frequency (786 MHz in this example) in mixer 63. The mixing frequency is derived by multiplying the L.O. 79 frequency (856 MHz in this example) by four.

After amplification in the first IF 64 the signal is mixed-down to a frequency of 70 MHz in mixer 63A. The mixing frequency is supplied by L.O. 79. After amplification in the second IF 64A, the signal is mixed-down to 10.7 MHz in mixer 63B. The mixing frequency is supplied by L.O. 79A.

The resulting 10.7 MHz baseband signal from mixer 63B may then be processed to recover the spread spectrum data. As described earlier, one of two methods may be used: the signal may be first despread then demodulated, or it may be demodulated first then despread.

Figure 4:
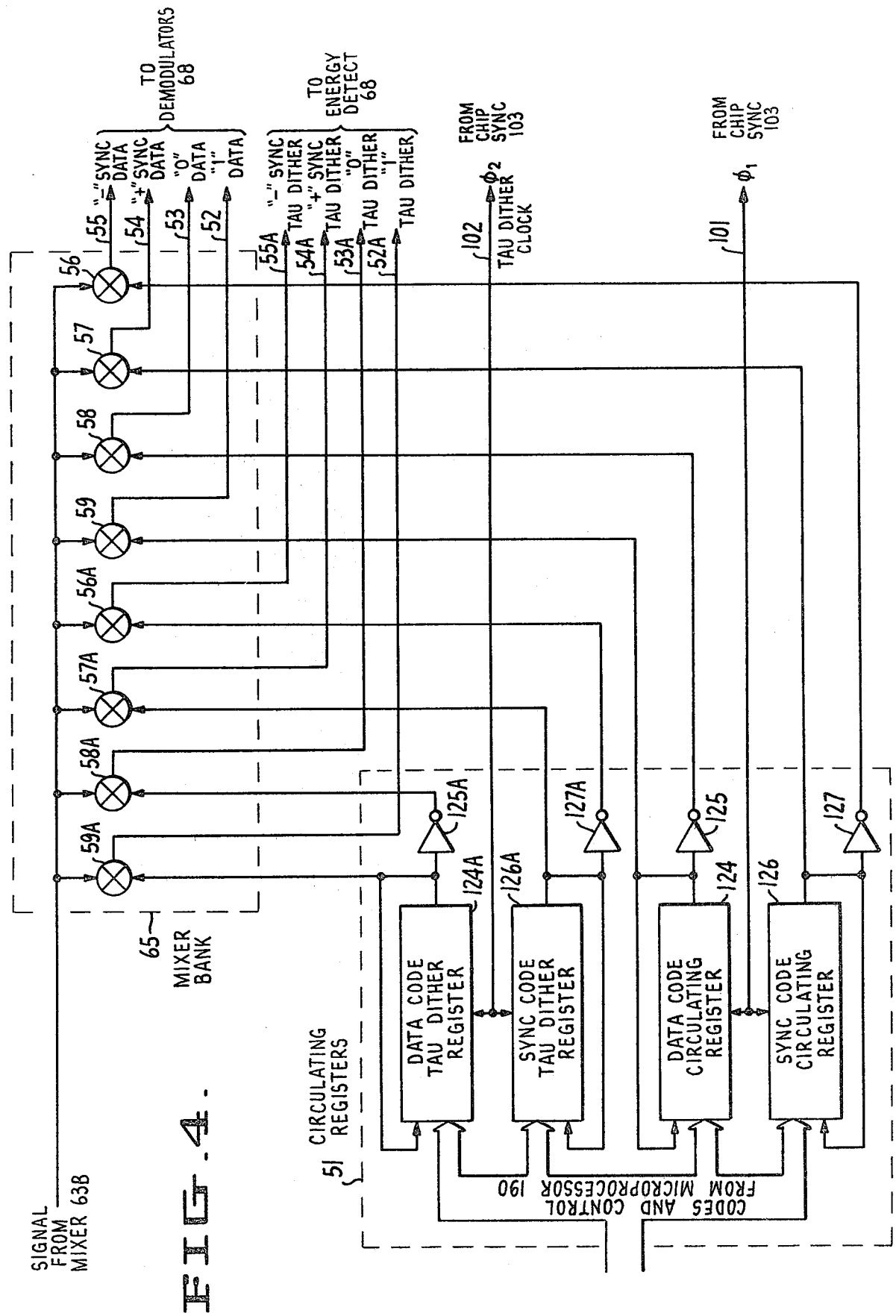
FIG. 4 is a block diagram of the despreading circuitry.

In the preferred embodiment despreading is performed first. Referring to FIGS. 3 and 4 the circuitry is shown. Despreading is performed first by despreading circuitry 139, then demodulation and energy detection are performed by demodulation circuitry 68. Despreading is essentially the multiplication of the received signal out of mixer 63B with the spreading codes assigned to the particular remote station.

Despreading circuitry comprises, FIG. 4, a mixer bank 65 (56, 57, 58, 59, 56A, 57A, 58A, 59A), and circulating registers 51 (124, 126, 124A, 126A). The circulating registers 51 receive the data and sync reference spreading codes from the microprocessor 190, and circulate them according to clocks $\phi_1$ on line 101, and $\phi_2$ on line 102, provided by the chip sync circuitry 103, and commands from the microprocessor 190, which may be a general purpose microprocessor. The microprocessor controls the time at which the registers 51 begin circulation of the codes such that the start of the code sequence of the local reference codes will be synchronized in time with the start of the code sequence for each incoming bit.

Register 124 circulates the ones bit data code and outputs that code to mixer 59. Inverter 125 inverts (polarity) the ones bit code to derive the zeros bit code, and then routes it to mixer 58. Similarly, register 126 circulates the +sync code and outputs the code to mixer 57. Inverter 127 inverts (polarity) the +sync code to derive the −sync code, and then routes it to mixer 56.

Registers 124A and 126A circulate the data and sync codes in accordance with a Tau-dithered clock $\phi_2$ on line 102, in cooperation with chip sync circuit 103 and microprocessor 190, for the purpose of obtaining bit and chip sync. These operations will be discussed in greater detail below.

An alternative method of despreading is to use a single circulating register, with the code being circulated and the timing of such circulation under microprocessor 190 control. For example, in a system where a sync code is used in addition to the data codes, the sync code may be inserted into the register periodically only when a sync is expected to appear, while at all other times the data codes are circulated.

When the output of mixer 63B (FIG. 3) is multiplied in the mixer bank 65 by the signals from the circulating registers 51, despreading occurs. When a spread spectrum signal is multiplied by the properly synchronized spreading code, the result is the original unspread signal. Therefore if the signal out of mixer 63B is $f_{baseband}g(m)$, where g(m) is the spreading operator, the product ($f_{baseband}$) g(m)×g(m) will equal $f_{baseband}$, whenever the spreading code g(m) is present in the received signal. Thus it may be seen that if the spreading code for a ones bit is present in the received signal, a baseband frequency will be output from mixer 59. Likewise if a +sync spreading code is present in the received signal a baseband frequency will be output from mixer 57. Similar results are obtained from mixers 58 and 56. Mixers 56A, 57A, 58A and 59A accept Tau-dithered codes from registers 124A and 126A in cooperation with chip sync circuit 103 and microprocessor 190 for the purpose of obtaining bit and chip sync. These operations will be discussed in greater detail below. When the looked-for spreading code is not present in the received signal, the output of the mixer will be a wideband signal which may be removed by filtering.

From a time domain point of view it may be seen that in mixer bank 65 the reference codes shift the phase of the L.O. 63B signal. For each chip of the code there is an associated phase shift. In the received signal the spreading code will have shifted the carrier phase, with each chip of the spreading code corresponding to some phase shift. When the received signal spreading code and the receiver reference code match, the phase shifts associated with each chip counteract each other and restore the original baseband signal. Hence, the output of the mixer bank 65 will be the baseband frequency of unshifted phase n chips in length, where n equals the code length. On the other hand, if the codes were not the same, the output from the mixer bank 65 will be n chips of baseband frequency having differing phases. It may be seen that if a phase detector were used to demodulate the waveform for each case, the result, where the codes match, would be a dc level n times that corresponding to an in-phase phase detector output for one chip. On the other hand, in the unmatched case, the output would tend toward zero (for near uncorrelated codes) or toward a negative level (for negatively correlated codes).

Level detection of the despread signal occurs in the demodulation circuitry 68, FIG. 5. Demodulators 49 examine the signals output from the mixer bank 65 for each of the lines: ones data 52, zeros data 53, +sync 54, and −sync 55. The output of each demodulator 49 is accumulated over a bit period by integrators 122, 123, 131 and 130.

Demodulators may take various well-known forms: a phase detector, a squaring loop detector or a Costas-loop detector.

Integration of the demodulator 49 outputs over the code period produces an equivalent energy level and allows noise to average out. Typically, in small dish antenna receiving systems the received signal level is very low. This results in less than a perfect match between reference code and received spread data codes. Therefore the energy level actually obtained from the integrators 122, 123, 131 and 130 may not equal the expected maximum level, although all chips were sent. As previously described, statistical techniques are employed to determine the minimum level output from the integrators 122, 123, 131 and 130 which may be treated as a received bit and thereby achieve the minimum required bit error rate.

This bit threshold decision process is implemented using comparators 132, 134, 135, and 137. Each comparator compares its integrator output with a threshold level (set to achieve a certain bit error rate). A positive output (i.e., that the level has been exceeded) from a comparator is treated as "hard" data. As mentioned above, since the low signal levels received often prevent a perfect match between reference code and spread data code which results in energy levels below threshold, a "soft data" record must be maintained. In the preferred embodiment comparators 133 and 136 implement one of the numerous methods to derive soft data. Essentially the levels of the integrators for the ones bit and the zeros bit are compared, and the greater level is deemed to indicate reception of that type of bit. Similarly soft sync is derived for the sync signal.

In the special case where all remote stations 4 in the system are assigned a single code for transmission of both data and sync information, there is no need for a hard/soft bit designation. Because, in this case, all that is transmitted is intended to be received by each remote station 4, a continuous stream of bits may be assumed. These bits consist of either data bits or filler bits. Since a bit is necessarily present for every bit position, the soft data and sync despread outputs may be looked to directly to decide whether the bit was a one or a zero.

The outputs of comparators 132 through 137 are sent to the microprocessor 190 for processing and storage, see FIG. 3. (Hard "+" sync data on line 138 is also sent to the framing sync circuitry 161, FIG. 6, for use there.) The microprocessor 190 maintains a record of the hard and soft data received, and even treats hard data as tentative until a minimum number of hard tentative bits have been received. This enhances the system bit error rate. If after a byte period several bits remain undetected, the microprocessor 190 will examine the soft data record for the missing bits. The microprocessor 190 "infers" that a byte of data was transmitted after it has tentatively received a minimum number (usually 5) of bits. The microprocessor lowers the bit decision threshold when it looks to the soft data or soft sync record for the missing bits and makes a best-guess as to the correct bit state. In this manner the transmitted data is statistically recovered from the despread and demodulated received signal.

A second method of data recovery is to demodulate first. Carrier lock is essential, however, if the modulation is to be properly detected. One implementation could consist of a phase detector which compares the incoming received signal with a voltage controlled reference. The phase detector output is used to correct the voltage controlled reference so that the reference tracks the carrier frequency deviations. The output of the phase detector also yields phase changes caused by BPSK modulation. These phase changes are the transmitted spread spectrum data stream. This data stream is then multiplied by the local reference code to despread the signal and yield the original data.

However, demodulation before despreading in small antenna receiving systems is difficult to implement due to the very low signal to noise ratios present. At such low levels carrier lock is difficult to maintain especially when interference is present.

Framing Synchronization

Proper time synchronization is essential to the satisfactory operation of the spread spectrum system. The framing synchronization circuit 161, FIG. 6, ensures that the frame timing maintained by the microprocessor 190 coincides with the frame timing of the received signal. Recall that a frame is defined as equaling the sync interval and that a sync character (or code) is sent periodically, for example once every tenth of a second, or once every 512 bits, where each bit is assumed to be in the longest code being used. By maintaining frame sync, it is ensured that the proper ordering of the received bits into bytes and packets is obtained.

Since a sync code is sent at a chip rate which is a multiple of 64, the frequency with which the sync bit is sent is a modulo 64 signal. That is, a binary synchronous counter, counting at a rate equal to the system chip rate, if started when a sync pulse is received and stopped when a subsequent sync pulse is received, will always show a multiple of 64. Therefore all of the binary counter outputs corresponding to values less than 64 will be zero, while some value equal to and greater than 64 will be nonzero. On the other hand, if the binary counter were started at some time other than at the time a sync bit was received, its outputs for values less than 64 will be nonzero at a point in time when a subsequent sync bit is received. Note that, given the precise chip rate of $2.4576 \times 10^6$ chips per second, a sync every tenth of a second is also a modulo 64 signal.

In the preferred embodiment, n-bit synchronous counter 162 counts the internal clock $\phi_1$ (i.e. the chip frequency) on line 101 from the chip sync circuitry 103. Counter 162 is initialized, in other words, the count is started from zero, when an out-of-sync signal 166 is received from NAND gate 165 and when a hard +sync level is received on line 138 from the demodulation circuitry 68. So long as the out-of-sync 166 indication is present, the counter 162 will reinitialize until sync is obtained.

The out-of-sync signal 166 is initiated only after counter 164 counts a small number, less than 10, of "no-sync" indications from NAND gate 163. NAND gate 163 monitors all outputs of synchronous counter 162 corresponding to values less than or equal to some multiple, m, of 64, where m<n.

AND gate 167 monitors synchronous counter 162 outputs corresponding to values greater than the multiple of 64 chosen above. For example, if a sync period were selected to be one tenth of a second, counter 162 would be a 16 bit synchronous counter. Outputs corresponding to values of $32 \times 64$ (2048) or less would be monitored by NAND gate 163, and outputs having values greater than 2048 are monitored by AND gate 167. At the precise clock rate of the system, 2.4576 MHz, a tenth of a second period corresponds to 245,760 chips per period. Therefore, all counter 162 outputs monitored by NAND gate 163 will be zero and all outputs monitored by AND gate 167 will be one whenever a sync singal is received, and if the count was started upon receipt of the last sync signal.

Likewise the out-of-sync indication 166 is not initiated until a minimum number of non-modulo 64 counts are produced by the counter 162 as relayed to counter 164 by NAND gate 163. This is to prevent momentary interruptions from disrupting the system operation.

In the special case where a single data code is common to all remote stations 4 in the network, sync characters are embedded in the data bit stream. Framing sync may therefore be performed within the microprocessor 190, thereby obviating the need for framing sync circuit 161 in this special case.

Chip Synchronization

The chip synchronization circuit 103, FIG. 6, aligns the internal clock $\phi_1$ on line 101 with the received chip stream 82, FIG. 5. Chip synchronization is attained when zero to one and one to zero transitions in the internal clock $\phi_1$ coincide with the actual or theoretical chip transition points in the received chip stream 82. A theoretical chip transition point is the point in time at which a chip state transition would occur if a chip state were changing from one value to another. By maintaining chip sync efficient despreading is achieved, hence process gain is maintained at near theoretical levels.

There are several methods of chip synchronization, of which the Tau-dither tracking method will be discussed here.

In the preferred embodiment of the invention the Tau-dither method is used, FIG. 6. This method involves the incremental shift of the internal clock $\phi_1$ which controls the circultion of the local reference codes in circulating registers 51. Here the triangle-shaped correlation characteristic of the code sequences used in the system provides the directivity for control of clock $\phi_1$ synchronization. FIG. 7 illustrates the effect of a clock shift upon correlation depending upon whether the clock $\phi_1$ is advanced or retarded with respect to the received chip sequence.

When the clock $\phi_1$ is in a retarded state, an incremental shift of the clock which tends to advance the clock position will result in an increased amplitude of the correlation. On the other hand, if the clock $\phi_1$ is in an advanced state, an incremental shift of the clock which tends to advance the clock position will result in a decreased amplitude of the correlation. By comparing the direction of these amplitude changes with respect to the waveform which generated the incremental shifts in the first place, a correction voltage may be derived to adjust the internal clock $\phi_1$ to exact synchronization with the received chip stream.

In one embodiment, low frequency oscillator 300 produces the waveform which causes the incremental shift in the clock $\phi_1$ VCO (voltage controlled oscillator) 304 generates the clock frequency $\phi_1$. IThe incremental phase modulator 302 receives the VCO 304 output and causes an incremental phase change in the clock $\phi_1$ according to the low frequency oscillator 300 output. This phase-shifted form of $\phi_1$ is output on line 102 and henceforth will be referred to as $\phi_2$. This Tau-dithered clock $\phi_2$ is then used with circulating registers 124A and 126A. As with the registers 124 and 126, registers 124A and 126A also circulate data and sync codes. The circulating codes are mixed with the incoming signal from mixer 63B using mixers 56A, 57A, 58A and 59A: the ones code from register 124A is mixed in mixer 59A, the zeros code from inverter 125A is mixed in mixer 58A, the +sync code from register 126A is mixed in mixer 57A, and the −sync code from inverter 127A is mixed in mixer 56A. However, because clock $\phi_2$ is Tau-dithered, the resulting output from mixers 56A, 57A, 58A and 59A is a Tau-dithered despread data and sync signal. These Tau-dithered signals are detected using energy detectors 49A in demodulating circuitry 68, see FIGS. 3 and 4. The outputs of the energy detectors are combined to form a spreading code correlation stream on line 82. In practice, when the inverse of the ones code (or +sync) is used for the zeros code (or −sync), a separate energy detect need not be performed on both despread lines. Therefore, in such case the Tau-dither despreading and energy detection may be performed satisfactorily without the use of mixers 58A and 56A as well as the energy detectors 49A on lines 53A and 55A. However, when distinct codes are used in "1", "0", +sync and −sync circulating registers, mixers and detectors for each must be provided. The output stream 82 contains the correlation amplitude changes due to the incremental clock $\phi_1$ position shifts. Band pass filter 305 extracts the amplitude component. The low frequency signal 300 is compared with the correlation amplitude change in phase detector 301. After filtering by low pass filter 303, the resulting correction signal 306 is applied to adjust the VCO 304 frequency. In this manner the received chip stream is constantly compared with the clock $\phi_1$ and chip signal corrections are constantly implemented.

An alternative implementation to chip sync 103 is to place VCO 304 and incremental phase modulator 302 under microprocessor (190) control (dotted lines, FIG. 6). In such an embodiment the microprocessor 190 evaluates the signals from the energy detectors 49A on line 82. In accordance with correlation response levels, see FIG. 7, found on line 82, the microprocessor 190 adjusts the amount and direction of phase shift imparted to the $\phi_2$ clock by the incremental phase modulator 302, as well as the frequency of VCO 304. Use of a microprocessor 190 to control the VCO 304 and incremental phase modulator 302 response provides added flexibility in the implementation of the Tau-dither sync method.

In the special case where a single data code is common to all remote stations 4 in the network, the synchronization circuitry differs from the more general case above. Based on the assumption that there is a continuous bit stream, a time lock operation is first performed.

Time lock synchronization involves first a bit synchronization operation. Bit synchronization requires that the internal reference code be compared to the incoming data stream at a rate greater than the data stream rate. The reference code is "raced along" the data stream by the internal clock until a correlation indication is obtained. See FIG. 7. At such point, the bit position is approximately defined.

To reduce hardware costs, the process of "racing" the code along the data stream may be accomplished using a single circulating register (e.g. register 124A) under microprocessor (190) control. The internal clock which controls the internal code circulating rate is under microprocessor (190) control and is derived from the system master clock, VCO 304. The microprocessor 190 causes the clock to "race" with respect to the incoming data stream until a positive correlation is obtained, on line 82 for example. This "racing" of the clock is obtained using a "bit-stealing" operation where the VCO (304) frequency is decreased by "stealing" bits from the VCO (304) output. By increasing the number of bits stolen, the clock frequency is increased. By decreasing the number of bits stolen the clock frequency is decreased.

Once the approximate sync is obtained, Tau-dither bit and chip sync, as previously described, see FIG. 6, is performed. By use of the Tau-dither chip synchronization method synchronization within one eighth to one fourth of a chip is obtained.

After chip sync is achieved the despread signal is demodulated 49, using a Costas demodulator, for example. The resulting data is sent to the microprocessor 190.

At this point the microprocessor 190, performs the framing sync operation by scanning the data for the unique sync character which is embedded within the data at periodic intervals. In order to ensure that a detected sync character is not a fortuitous combination of bits due to the arrangement of the data, the microprocessor 190 will verify that sync characters are present at the next several sync intervals, for a small number of intervals less than ten.

Central Station 14

Figure 1:
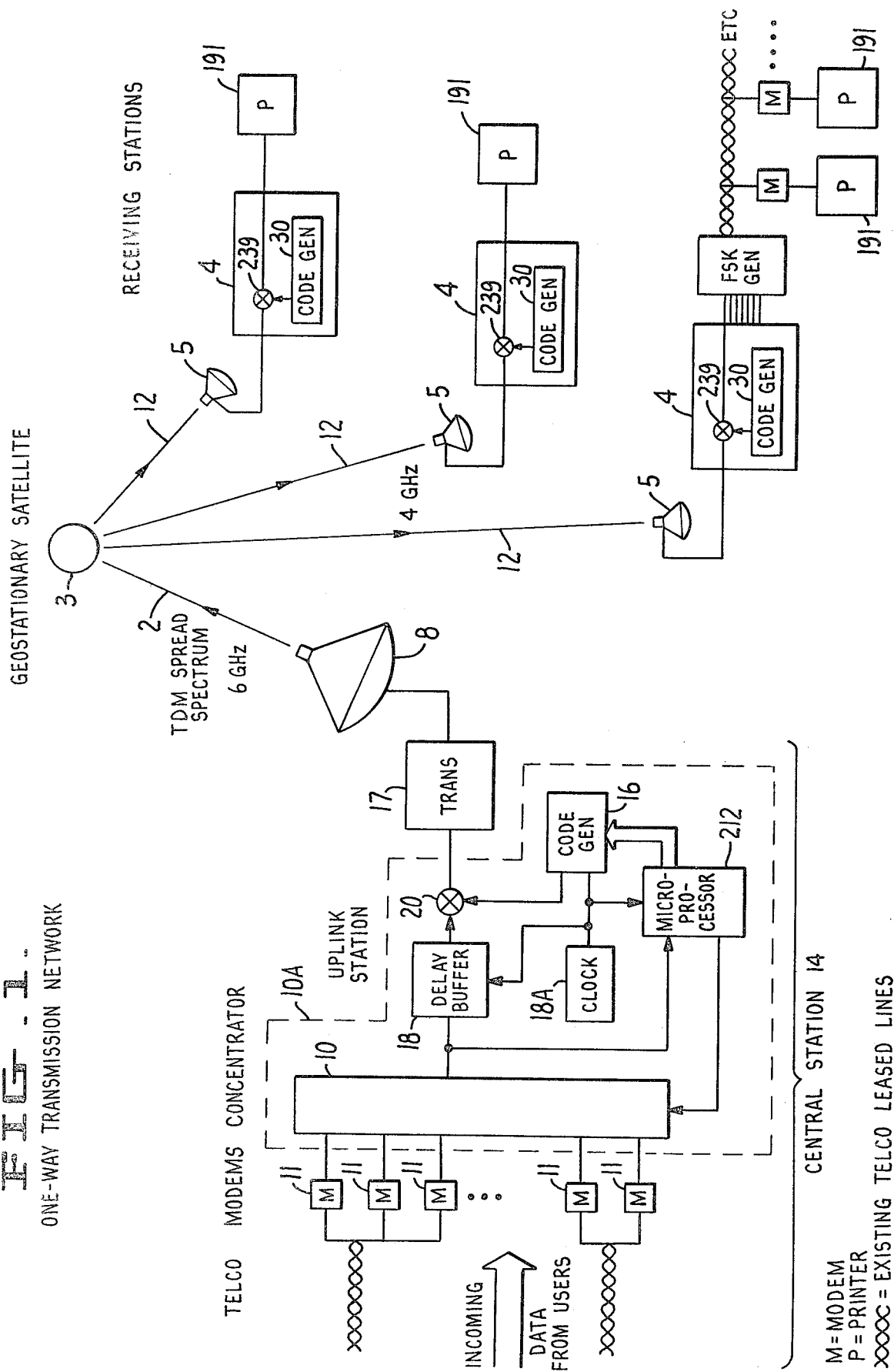
FIG. 1 is a simplified functional block diagram of the system level operation of a one-way transmission network embodiment according to the invention.
Figure 8:
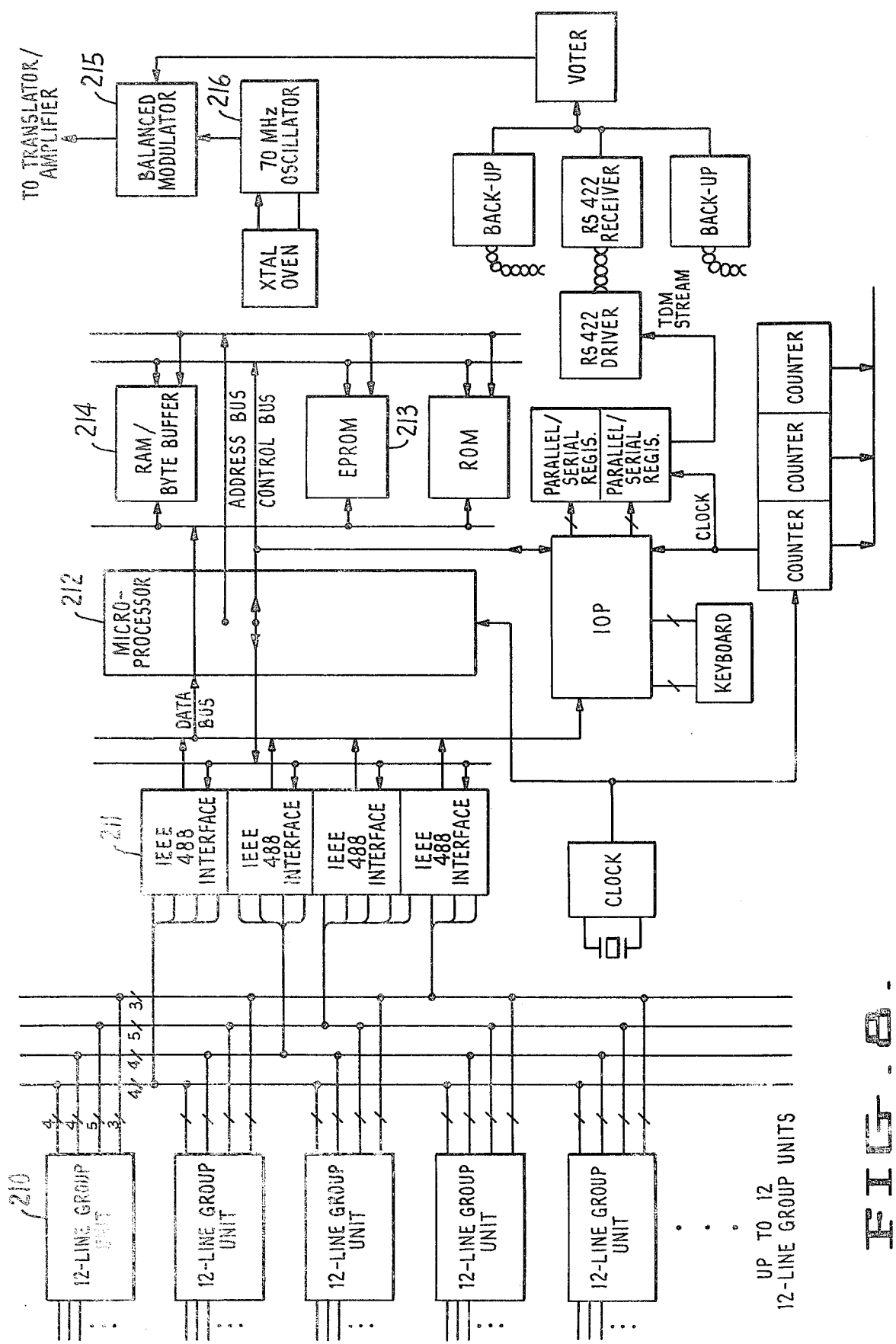
FIG. 8 is a block diagram of the central station input-/output and data concentrator circuitry.

Referring to FIGS. 1, 3, and 8, the central station 14 will now be described. The data concentrator (10) portion of the central station 14 comprises RS-232 Electrical Signal Level Changers 210, Universal Asynchronous Receive/ Transmit parallel to serial devices (UART) 211 and microprocessor 212, which may be a general purpose microprocessor. See FIG. 8.

Data from up to 144 different sources (e.g. input links 11) are accepted by the RS-232 level changers 210. The data are then transformed from parallel form to a serial bit stream by the UART devices 211. A UART 211 device is examined by the microprocessor 212 whenever it sends a UART attention flag to the microprocessor 212. The attention flag tells the microprocessor 212 that the UART 211 has begun to receive data. When the microprocessor 212 encounters a UART 211 which is full, it transfers the contents of that UART 211 into the byte buffer 214. Associated with the UART 211 is the source of the data from which the microprocessor, by examining its external memory, EPROM 213, may derive the identity of the remote station to which the data is to be sent and the spreading code key to be used. The spreading code key is then stored in RAM 214 until the data in the byte buffer 214 are sent to the delay buffer 18 and thence to the multiplier 20.

As the data are routed to the multiplier 20, the microprocessor 212, using the spreading code key from RAM 214, causes code generator 16 to generate the desired spreading code. This spreading code is then routed to multiplier 20 where it is used to spread the incoming data.

A sync character is inserted at periodic intervals, for example, every tenth of a second. At this point the delay buffer 18 accumulates the incoming data while the microprocessor 212 causes the code generator 16 to output the sync spreading code or character to the multiplier 20. When the sync code or character has been inserted into the bit stream, spreading of the data is resumed.

Note that the multiplier 20 is essentially an exclusive-OR gate (XOR). Therefore, as the spreading code is applied to one input of multiplier 20 and the data applied to the other, a "ones" data bit results in an output of an unaltered ones bit spreading code.

If the data are zeros bits, the output will be the inverse (polarity) of the ones bit spreading code, or the zeros bit spreading code. (Recall that the zeros bit spreading code is chosen in the preferred embodiment to be the inverse (polarity) of the ones spreading code. The same is true for the +sync and −sync spreading codes.)

If there are no data to be encoded, a filler character is sent to keep the remote stations 4 in a locked condition.

Once the data have been spread, they are applied to balanced modulator 215 which causes the 70 MHz local oscillator signal 216, applied to the other multiplier input, to be BPSK modulated. Note that the local oscillator 216 is controlled by a crystal maintained under environmentally controlled conditions, thereby promoting excellent long term stability of the 70 MHz subcarrier frequency. Modulation is performed at a high frequency level for ease of up-conversion. The output of the balanced modulator 215 is then frequency translated to the nominal 6 GHz carrier frequency, amplified, and transmitted, using a large dish antenna 8 to the geostationary satellite 3.

Figure 2:
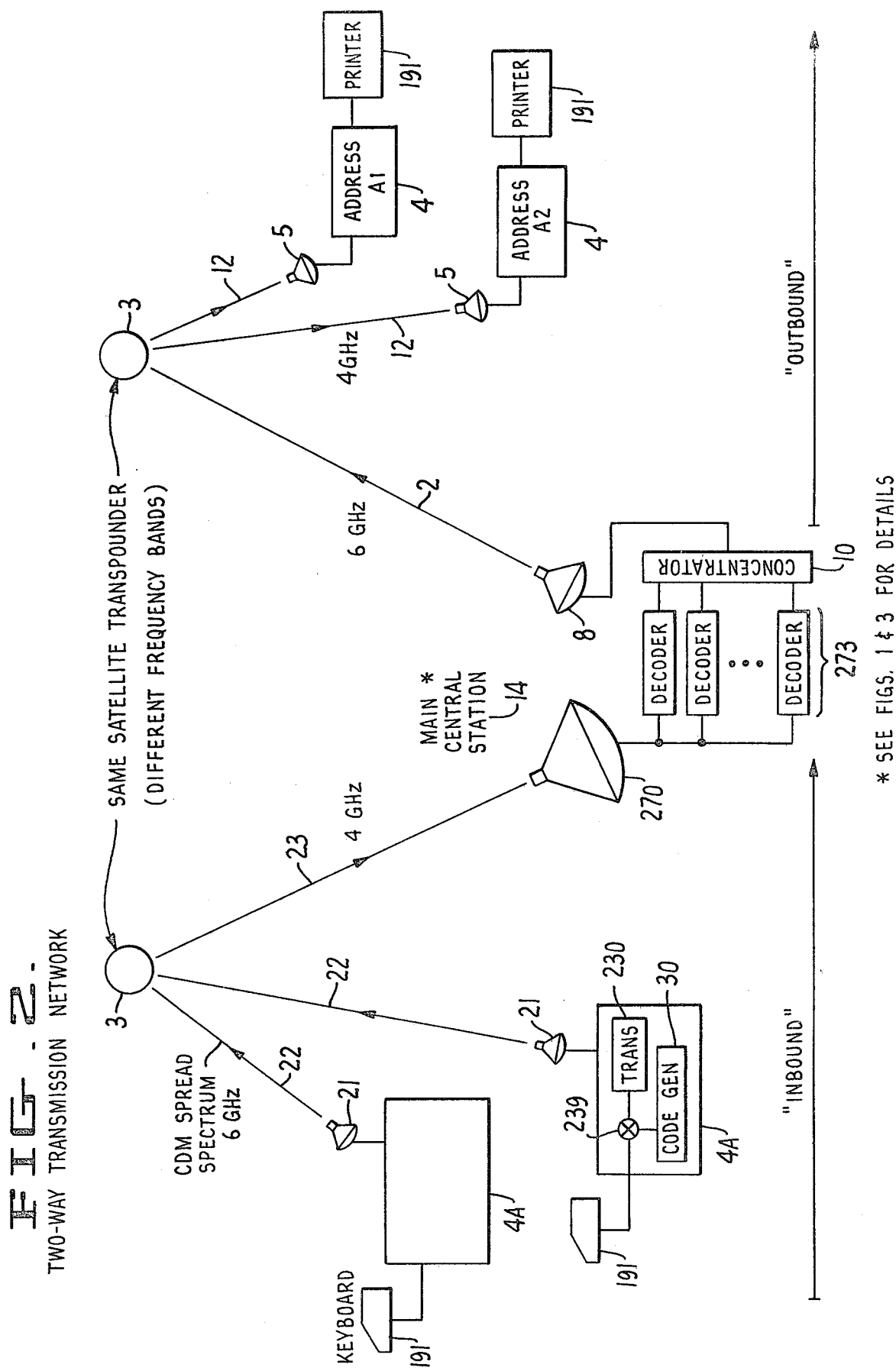
FIG. 2 is a simplified functional block diagram of the system level operation of a two-way transmission network embodiment in accordance with the invention.

The Inbound Link: FIGS. 2, 3

As described in the system level description of the two-way transmission network, supra, the two-way network utilizes the one-way transmission network for the second hop, or "outbound link", FIG. 1, and adds remote station code division multiplex (CDM) transmission capability 230 to the remote stations, as well as CDM receiving capability 231 at the central station 14 for the first hop, or "inbound link", of the double hop transmission. One remote station 4A may thus communicate with another remote station or stations 4 by routing the transmission through the central station 14 via satellite 3, see FIG. 2. The central station 14 receives the CDM transmission from the sending station 4A, despreads it, then respreads it with the addressed station spreading code, and then transmits the respread data in TDM form through the geostationary satellite 3 to the addressed remote station 4.

Added Transmitter Circuitry

Referring to FIG. 3, the transmitter circuitry 230, added to give a remote station CDM transmission capability, is shown. This circuitry is basically a BPSK or FSK transmitter, but with a frequency synthesized carrier source 243, 244, 235 and 236, as well as spread spectrum encoding 30, 239. Data, clocks and controls are provided by the receiver section of the remote station.

The frequency synthesized carrier frequency is derived by dividing the VCO 235 output by a scaling factor (frequency selector 243) selected by the microprocessor 190. The frequency selector 243 comprises a programmable counter. The output of the frequency selector 243 is then compared in XOR gate 244 against a reference signal derived from the internal receiver clock $\phi_1$. The output of XOR gate 244 is then filtered in low pass filter (LPF) 236 and applied to adjust the scaled VCO 235 frequency to coincide with the reference frequency. This permits the frequency synthesized carrier to track the receiver clock $\phi_1$ even when the two are at different frequencies.

The microprocessor 190 controls the timing of the application of the data to the multiplier (XOR gate) 239 as well as the timing and generation of the spreading code 30.

The spreading code used is unique to each remote station. In the preferred embodiment the code length is selected to be 2048 chips. The code corresponding to a ones bit is different from that for a zeros bit. The code generator comprises a combination of shift registers, selected outputs of which are exclusive-OR'ed and reintroduced into the shift register input. The number of ones chips is approximately equal to the number of zeros chips in each code.

Transmission from the remote station transmitter circuitry 230 is simultaneous with respect to inbound transmissions of other remote stations. The timing of these transmissions is based upon the received sync signals transmitted by the central station 14 on the outbound link. In this way the timing sync problem at the central station despreading receiver bank 273 has a common reference point from which correction factors for distance and earth rotational shift may be calculated. These correction factors are implemented at the central station 14.

Simultaneous transmissions by the remote stations require non-interfering codes. This, plus the need for greater process gain, dictates the choice of code length of a thousand chips or more as well as orthogonal or near orthogonal codes.

To summarize, the add-on transmitter circuitry 230 receives data, under microprocessor 190 control, from a remote station user I/O terminal 191. The microprocessor 190 causes the code generator 30 to generate the remote station's two 2048 chip CDM codes, as well as adjusts the frequency selector 243 which sets the carrier frequency. XOR gate 239 multiplies the data with the spreading codes, all under microprocessor 190 control. The output of XOR gate 239 modulates the frequency synthesized carrier in balanced modulator 234. The output of the balanced modulator is then frequency translated 233 to the desired frequency and transmitted via geostationary satellite 3 to the central station 14 using a 4 foot diameter dish antenna 21.

Central Station Receiving Circuitry 231

Referring to FIG. 3, the central station receiving circuitry 231 allows the station to receive signals from all remote stations 4A served by the geostationary satellite 3. With chip rate for the system selected to be approximately 2.45 MHz, the null-to-null bandwidth of one channel is 2×2.45 MHz=4.9 MHz. In addition, each channel may accommodate 2048÷2=1024 users assuming two codes per user. (The number of orthogonal codes is approximately equal to code length.) Theoretically, the central station 14 would be capable of receiving approximatelly 11×1024=11,264 different remote station transmissions. (Assumes 36 MHz transponder bandwidth and signals positioned 1.2×R center-to-center spacing where R equals chip rate. This spacing is the closest practical bandwidth before encountering serious intersymbol interference.)

In the preferred embodiment, the bandwidth chosen per channel is 4.9 MHz (2×2.45 MHz), thereby permitting six or seven channels within the 36 MHz bandwidth of a standard satellite transponder, with one of those channels reserved for the outbound link. Therefore, the central station 14 should be capable of receiving data from at least 5×1024=5120 different remote stations per 36 MHz transponder.

Signals received by the 60 foot receiving antenna 270 of the central station 14 are first mixed (271) down to a nominal 70 MHz IF frequency. The signal is then separated into the five transponder channels by L.O./mixer combinations 272. Associated with each L.O./mixer output is a bank of despreading receivers 273. See FIG. 3. Each despreading receiver is loaded with the code sequence of a different potential transmiting remote station 4A. The number of despreading receivers per channel cannot economically be made equal to the total number of remote stations using a channel, therefore the incoming signal is compared to only a portion of the possible codes at one time. The remaining codes are cycled into the despreading receiver 273 on successive cycles of the search. The number of receivers 273 in the bank are selected statistically in light of the expected traffic patterns and acceptable acquisition period. Typically there are 256 despreading receivers in a bank, and acquisition time takes a maximum of 15 to 30 seconds.

Associated with each code sequence is a unique timing correction factor. The timing correction factor is a function of the particular remote station location, and, to a lesser extent, daily shifts in the geostationary satellite 3 position. In loading a particular code into a despreading receiver, the microprocessor 212 implements the correction factor by delaying the start of the spreading sequence by the appropriate amount. By assigning the timing correction task to the central station 14, the need for each remote station to maintain correction capability is eliminated. Additionally, unauthorized use of a remote station, e.g., after a theft, will be prevented should the station be moved from its designated location.

When a despreading receiver 273 detects a matching spreading code in the incoming data stream, it retains the code in its circulating register and waits for additional transmissions.

As in the remote station spreading circuitry 139, described supra, the incoming signal is despread and detected. The noise averages out and the signal components accumulate additively. Each bit accumulation is examined to see if the required threshold is exceeded. If a certain number of hard data bits are received, the microprocessor 212 will examine the soft data information for the best decision on the missing bits.

After despreading, the data are treated as are data from a terrestrial source 11. The despread data contains address and raw data information. As with data received from a terrestrial source, the data concentrator 10 and microprocessor 212 serialize and spread the data for retransmission to the addressed remote station 4.

The microprocessor 212 also maintains a record of the system usage by each remote station.

Operation of the Two-Way Network

Referring to FIGS. 2 and 3, the operation of the two-way transmission network will be described. At the remote station 4A the user inputs data on I/O device 191, including designation of the remote station to which the information will be sent. Microprocessor 190 routes the data to XOR gate 239 and at the same time causes code generator 30 to generate the remote station 4A CDM spreading codes. The data are spread in synchronization with the system sync timing. The spread data are then transmitted CDM 22 to the geostationary satellite 3 using a 4-foot dish antenna 21. The geostationary satellite 3 receives the transmission and relays 23 the signal to the central station 60-foot dish 270. The central station receiving circuitry 231 matches the signal with a local reference code obtained from memory and circulated in a despreading receiver 273. The reference code which matches the signal identifies the remote station from which the signal was transmitted. The data and address information are despread and the data respread in the addressed station's spreading code. The spread information is transmitted Time Division Multiplexed, 2, 12 Binary Phase Shift Keying via the geostationary satellite 3 to the addressed remote station 4. The addressed remote station 4 detects the data intended for it in the transmitted stream. The data are first despread, then demodulated to yield the transmitted data. Chip sync 103 maintains chip and bit synchronization, and frame sync 161 maintains code and frame alignment. The microprocessor 190 forms the despread data into bytes and then, with appropriate controls, outputs the data 191 to the user.

In the special case where a single code contains both sync and data information, time lock is first obtained by racing the internal reference code along the incoming chip stream and observing the despread output for a positive correlation indication. Once time lock or bit sync is obtained, Tau-dither techniques are used to fine-tune the positioning of the first chip of the incoming bits with the first chip of the internal reference code. After chip sync is obtained, the despread data are demodulated. The microprocessor extracts the sync character from the demodulated data and adjusts the system timing accordingly.

What is claimed is:

1. An earth satellite communications system for transmitting data from a plurality of users through a repeating geostationary satellite to a plurality of receiving earth stations, comprising A central transmitting station receiving data from a plurality of users, said station including
means for converting the format of said data into a form suitable for transmission to a satellite,
means for spread spectrum processing the converted data, and
means for transmitting the spread spectrum processed converted data to a repeating geostationary satellite, and A plurality of receiving earth stations, each of said receiving earth stations including
wide beamwidth, low gain antenna means, said antenna means including a fixed directional antenna having a beamwidth wider than the standard orbital spacing of geostationary satellites, whereby said antenna receives signals from more than one geostationary satellite, and detection means coupled to said antenna means, said detection means including spread spectrum processing means, for recovering data sent to said receiving earth station via said repeating geostationary satellite.

2. The combination of claim 1 wherein said detection means further includes means for converting the format of said data into a form suitable for a user.

3. The combination of claims 1 or 2 wherein said antenna means includes an antenna having a gain providing a signal level below the thermal noise floor when standard (nonspread spectrum) satellite modulation techniques are used.

4. The combination of claim 1 wherein said spread spectrum processing means in said receiving earth stations includes means storing a local reference code for comparison to signals received for recovering data sent to said receiving earth station.

5. The combination of claims 1 or 4 wherein said spread spectrum processing means includes means for synchronizing said processing means to the received signals.

6. The combination of claim 1 wherein said spread spectrum processing means in said central station includes means for processing data for particular receiving earth stations with a spreading code unique to such stations.

7. The combination of claims 1 or 6 wherein said spectrum processing means in said central station includes means for processing data for particular receiving earth stations with a spreading code having a length commensurate with the sensitivity of the least sensitive station among said particular receiving earth stations.

8. The combination of claim 1 or 6 wherein said means for transmitting transmits said data in a time division format.

9. The combination of claim 6 wherein said means for transmitting transmits data in a time division format having a plurality of time slots, wherein data processed by each unique spreading code occupies the next available time slot.

10. In a geostationary earth satellite communications system, wherein the signals relayed from a repeating geostationary satellite are power limited spread spectrum signals, a receiving earth station comprising wide beamwidth, low gain antenna means, said antenna means including a fixed directional antenna having a beamwidth wider than the standard orbital spacing of geostationary satellites, whereby said antenna receives signals from more than one geostationary satellite, and detection means coupled to said antenna means, said detection means including spread sprectrum processing means, for recovering data sent to said receiving earth station via said repeating geostationary satellite.

11. The combination of claim 10 wherein said detection means further includes means for converting the format of said data into a form suitable for a user.

12. The combination of claim 10 wherein said antenna means includes an antenna having a gain providing a signal level below the thermal noise floor when standard (nonspread spectrum) satellite modulation techniques are used.

13. The combination of claim 10 wherein said spread spectrum processing means includes means storing a local reference code for comparison to signals received for recovering data sent to said receiving earth station.

14. The combination of claims 10 or 13 wherein said spread spectrum processing means includes means for synchronizing said processing means to the received signals.

15. An earth satellite communications system wherein a plurality of stations transmit data through a repeating geostationary satellite and a terrestrial relay station to a plurality of receiving earth stations, the combination comprising a plurality of transmitting stations, each comprising
means receiving data for transmission to a repeating geostationary satellite,
means for spread spectrum processing said data, and
means for transmitting said spread spectrum processed data to said repeating geostationary satellite, said transmitting means including wide beamwidth, low gain antenna means, and a terrestrial relay station, comprising
antenna means,
detection means coupled to said antenna means, said detection means including spread spectrum processing means for recovering data sent by said transmitting station,
means for spread spectrum processing the recovered data, and
means for transmitting the spread spectrum processed data to said repeating geostationary satellite, and a plurality of receiving earth stations, each of said receiving earth stations comprising
wide beamwidth, low gain antenna means, said antenna means including a fixed directional antenna having a beamwidth wider than the standard orbital spacing of geostationary satellites, whereby said antenna receives signals from more than one geostationary satellite, and
detection means coupled to said antenna means, said detection means including spread spectrum processing means, for recovering data sent to said receiving earth station via said repeating geostationary satellite.

16. The combination of claim 15 wherein said terrestrial relay station receives data from terrestrial sources, in addition to said recovered data, for transmission to said satellite, said repeating geostationary spread spectrum processing means further processing said additional data and said transmitting means further transmitting said processed additional data.

17. The combination of claim 15 wherein said transmitting station transmitting means transmits on different frequencies than said relay station transmitting means.

18. The combination of claims 15 or 17 wherein said transmitting station transmitting means transmits in a code division multiplex format and said relay station transmitting means transmits in a time division multiplex format.

19. The combination of claim 17 wherein there are a plurality of transmitting stations and a plurality of receiving earth stations, and at least one pair of transmitting and receiving earth stations are located at the same geographic site.

20. The combination of claim 19 wherein each transmitting station has a unique spreading code or pair of codes.

21. The combination of claims 19 or 20 wherein said means for spread spectrum processing in said relay station includes means for processing data for particular receiving earth stations with a spreading code unique to such stations.

* * * * *

UNITED STATES PATENT AND TRADEMARK OFFICE
CERTIFICATE OF CORRECTION

PATENT NO. : 4,455,651
DATED : Jun. 19, 1984
INVENTOR(S) : Baran

It is certified that error appears in the above-identified patent and that said Letters Patent is hereby corrected as shown below:

Col. 25, line 11: "claims 1 or 2" should read --claim 1--.

Col. 25, line 35: "claim" should read --claims--.

Signed and Sealed this

Fifth Day of February 1985

[SEAL]

*Attest:*

DONALD J. QUIGG

*Attesting Officer*  *Acting Commissioner of Patents and Trademarks*

UNITED STATES PATENT AND TRADEMARK OFFICE
CERTIFICATE OF CORRECTION

PATENT NO. : 4,455,651

DATED : Jun. 19, 1984

INVENTOR(S) : Baran

It is certified that error appears in the above-identified patent and that said Letters Patent is hereby corrected as shown below:

Col. 26, line 44: "said satellite, said repeating geostationary spread" should read --said repeating geostationary satellite, said spread--.

Signed and Sealed this

Twenty-fifth Day of November, 1986

Attest:

DONALD J. QUIGG

Attesting Officer   Commissioner of Patents and Trademarks